United States Patent
Yokoi

(10) Patent No.: US 8,599,234 B2
(45) Date of Patent: Dec. 3, 2013

(54) IMAGE FORMING APPARATUS

(75) Inventor: Junichi Yokoi, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/360,432

(22) Filed: Jan. 27, 2012

(65) Prior Publication Data

US 2012/0195608 A1   Aug. 2, 2012

(30) Foreign Application Priority Data

Jan. 28, 2011   (JP) ................................. 2011-016262

(51) Int. Cl.
| | |
|---|---|
| B41J 2/385 | (2006.01) |
| B41J 2/455 | (2006.01) |
| B41J 2/47 | (2006.01) |
| B41J 2/45 | (2006.01) |
| B41J 2/435 | (2006.01) |

(52) U.S. Cl.
USPC ........... 347/238; 347/130; 347/132; 347/233; 347/237; 347/247

(58) Field of Classification Search
None
See application file for complete search history.

(56) References Cited

U.S. PATENT DOCUMENTS

| | | |
|---|---|---|
| 6,215,511 B1 | 4/2001 | Asako et al. |
| 2008/0130021 A1* | 6/2008 | Inoue et al. .................... 358/1.7 |
| 2012/0147116 A1* | 6/2012 | Kinoshita et al. ............. 347/118 |

FOREIGN PATENT DOCUMENTS

| | | |
|---|---|---|
| JP | H11-070697 A | 3/1999 |
| JP | 2002-019178 A | 1/2002 |
| JP | 2002-052757 A | 2/2002 |
| JP | 2002-067380 A | 3/2002 |
| JP | 2002-254703 A | 9/2002 |
| JP | 2006-305763 A | 11/2006 |
| JP | 2007-090548 A | 4/2007 |
| JP | 2007-160930 A | 6/2007 |

OTHER PUBLICATIONS

Japan Patent Office, Decision of Grant for Patent for Japanese Patent Application No. 2011-016262 (counterpart Japanese patent application), mailed Oct. 23, 2012.

* cited by examiner

Primary Examiner — Matthew Luu
Assistant Examiner — Kendrick Liu
(74) Attorney, Agent, or Firm — Baker Botts L.L.P.

(57) ABSTRACT

In an image forming apparatus, a quantized amount of correction A is applied to emission timing with which each light-emitting point is to be caused to give off light emission to thereby align points of exposure to light emitted from the light-emitting points, substantially with a straight line extending in the main scanning direction on a photoconductor. The amount of correction A is adjusted by adding or subtracting one to or from one of the tentatively determined amounts of correction $A1$, $A2$ for light-emitting point ($P1$, $P2$) at opposite ends of two adjacent light-emitting chips, if formula (1) is not satisfied:

$$|\Delta E - B| < \frac{D}{2} \quad (1)$$

where B is difference $|C1-C2|$ between amounts of shift $C1$, $C2$ of the light-emitting points ($P1$, $P2$) stored in a memory, $\Delta E$ is a value derived from $|A1-A2|$ multiplied by the quantization unit D, $|A1-A2|$ is the difference between the amounts of correction $A1$, $A2$.

6 Claims, 11 Drawing Sheets

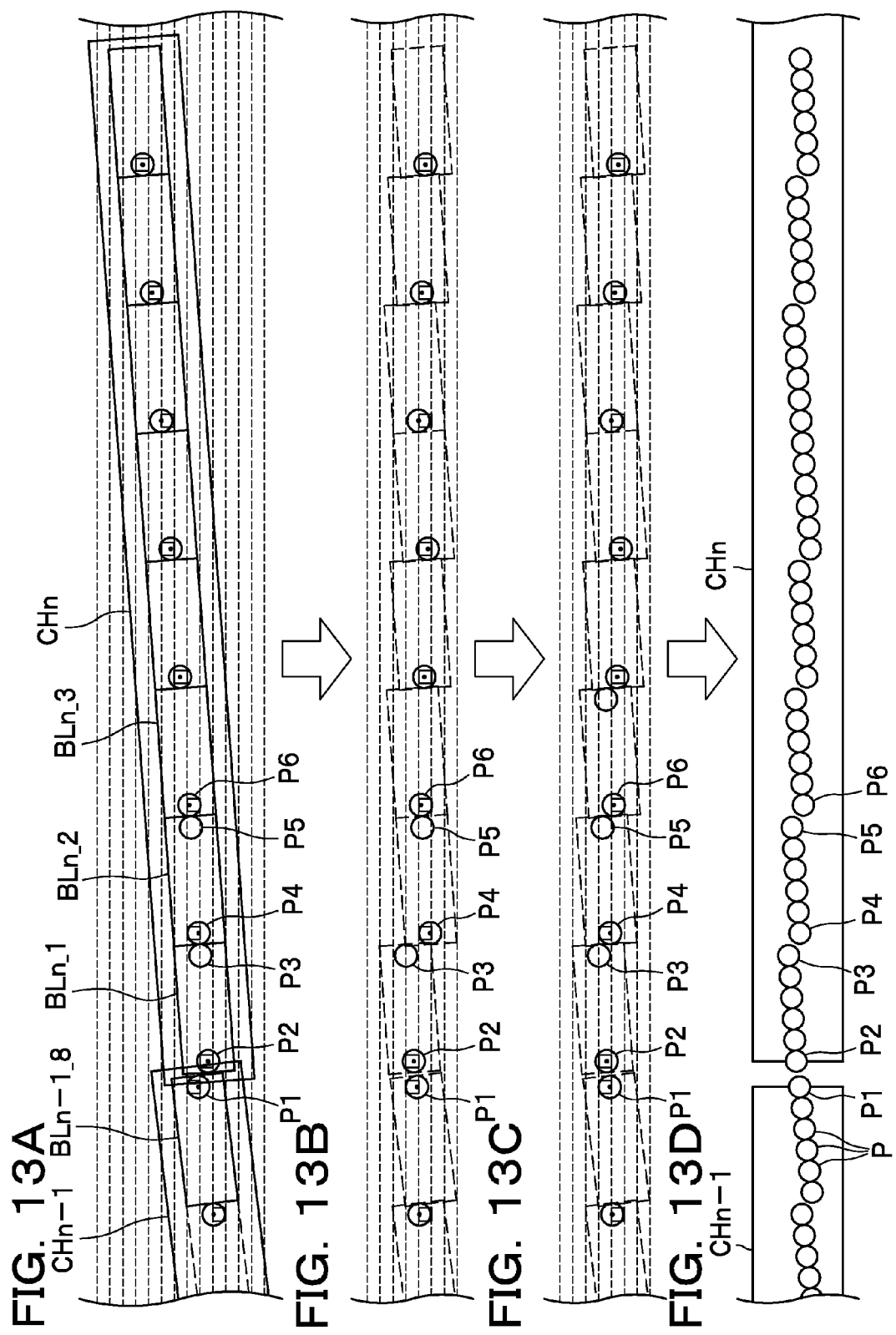

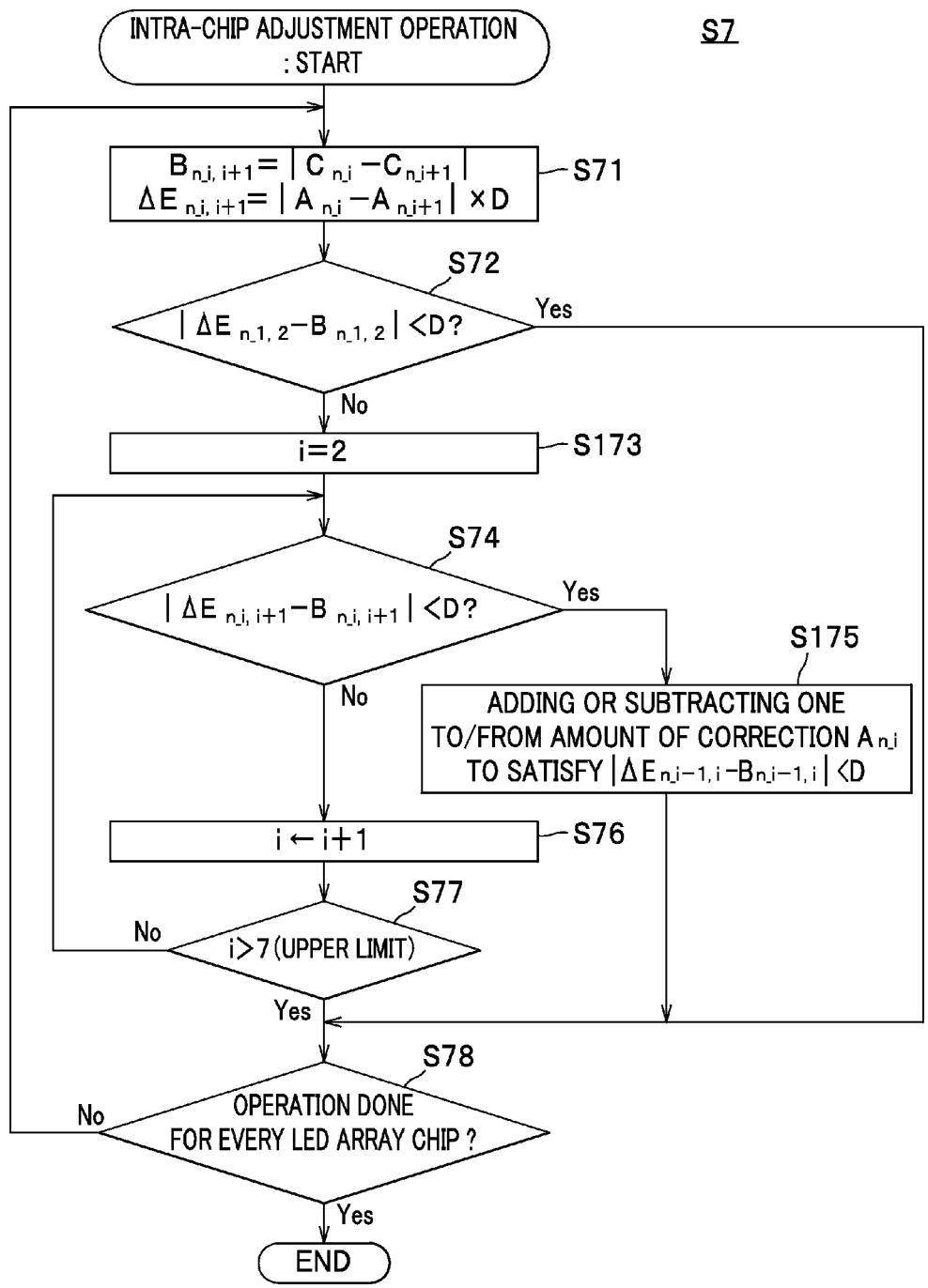

IMAGE FORMING APPARATUS

CROSS-REFERENCE TO RELATED APPLICATION(S)

This application claims priority from Japanese Patent Application No. 2011-016262, filed on Jan. 28, 2011, the disclosure of which is incorporated herein by reference in its entirety.

BACKGROUND

1. Field

The present invention relates to image forming apparatuses, and particularly to an electrophotographic image forming apparatus comprising an exposure device which includes an exposure head having a plurality of light-emitting points arranged in a main scanning direction.

2. Description of Related Art

In an electrophotographic image forming apparatus, a photoconductor is exposed to a light beam to form an electrostatic latent image on the photoconductor. In recent years, an exposure device including an exposure head having a plurality of light-emitting points, as implemented by light-emitting diodes (LEDs) or the like, arranged in a main scanning direction (i.e., the direction perpendicular to the direction of transport of a sheet on which an image is to be formed) has been provided for use in this exposure process.

Such an exposure head is typically configured to include a plurality of light-emitting chips arranged in the main scanning direction on a circuit board, and each light-emitting chip may be an LED array chip fabricated through a semiconductor process in which a plurality of LEDs as light-emitting elements are arranged precisely in a single row and packaged in a single semiconductor chip. To be more specific, the LED array chips are arranged in the main scanning direction on the circuit board in such a manner that adjacent LED array chips are in positions shifted from each other in a sub scanning direction that is perpendicular to the main scanning direction so as to prevent a gap in the main scanning direction from being left between a light-emitting point at an end of one chip and a light-emitting point at an opposite end (closer to the one chip) of another chip adjacent to the one chip. Since a single exposure head includes a plurality of chips so arranged that adjacent chips are in positions shifted from each other in the sub scanning direction, and thus the light-emitting points of the LEDs are not aligned in the main scanning direction, a correction may be made to the timing of emission at each of the light-emitting points so that illuminated spots (points of exposure) on the photoconductor are aligned in a straight line. To achieve this correction, usually, amounts of shift of the positions of light-emitting points in the sub scanning direction from a reference line extending in the main scanning direction (such reference line may be predetermined in the exposure head or in the image forming apparatus) are measured, and the data on amounts of correction corresponding to the measured amounts of shift are retrievably stored in the exposure device or in the other portion of the image forming apparatus.

In order to store, as a digital value, the amount of shift in the sub scanning direction of the position of each light-emitting point, the value of the amount of shift may be divided by a quantization unit to obtain a quotient as a digitized (quantized) value of the amount of shift. However, under this scheme, depending upon the actual state of the shift in the positions of the light-emitting points from the reference line, the amount of shift or gap (disparity in position) in the sub scanning direction of adjacent light-emitting points from each other would become unexpectedly great. Accordingly, a correction, if made properly, would yield a desirable result of the amount of shift (gap) in the sub scanning direction of adjacent light-emitting points from each other, that is, not greater than half of the quantization unit; however, if such a correction were made by performing a simple operation of quantization of the amounts of shift, the thus-obtained amounts of correction would possibly yield an undesirable result of the amounts of shift (gap) in the sub scanning direction of a pair (or pairs) of adjacent points of exposure from each other, that is, greater than half of the quantization unit.

In particular, the exposure device with a plurality of light-emitting chips arranged as described above would involve an error (displacement) in relative positions of the chips not only in the sub scanning direction but also in the main scanning direction, when the chips are arranged on the circuit board. Therefore, if a gap in the sub scanning direction is left between a light-emitting point at an end of one light-emitting chip and a light-emitting point at an opposed end of another light-emitting chip adjacent to the one light-emitting chip, a gap in the main scanning direction would be added thereto, and thus a larger gap would possibly be made (which would result in irregularities) in the resulting image formed of points of exposure (illuminated spots).

Under the circumstances, there is a need to provide an image forming apparatus with an improved module for determination of the amount of correction to be made to the timing of emission at each light-emitting point, whereby irregularities, which would appear due to shift or disparity of the positions of adjacent light-emitting points in the sub scanning direction from each other, in the resultant image can be reduced.

The present invention has been made in an attempt to address the aforementioned problem in prior art.

SUMMARY

In one aspect of the present invention, an image forming apparatus is provided which comprises an exposure device, a photoconductor, a controller and a memory. The exposure device includes an exposure head having a plurality of light-emitting points arranged in a main scanning direction. The photoconductor is configured to be exposed to light emitted from the exposure device whereby an electrostatic latent image is formed thereon. The controller is configured to control emission of the exposure device. The memory is configured to store an amount of shift C in a sub scanning direction of a position of each light-emitting point of the exposure head from a reference line extending in the main scanning direction. The exposure head of the exposure device includes a plurality of light-emitting chips on which the plurality of light-emitting points are arranged in the main scanning direction. The plurality of light-emitting chips are arranged in positions such that adjacent light-emitting chips arranged in the main scanning direction are shifted from each other in position in a sub scanning direction that is a direction perpendicular to the main scanning direction. The controller includes: an emission timing determination unit configured to determine a quantized amount of correction A to be applied to emission timing with which each light-emitting point is to be caused to give off light emission; and an exposure head driver unit configured to cause each light-emitting point to give off light emission at a time shifted from a reference time by an amount of time corresponding to the amount of correction A determined by the emission timing determination unit, whereby points of exposure to light emitted from the light-emitting points are aligned substantially with a straight line extending in the main scanning direction on the photoconductor. The emission timing determination unit includes a tentative correction amount determination operation module configured to tentatively determine an amount of correction A for each light-emitting point based on a quotient obtained by dividing the amount of shift C stored in the memory by a quantization unit D, an inter-chip adjustment operation module configured to perform, if the following formula (1) is not satisfied for each pair of tentatively determined amounts of correction A1, A2, an inter-chip adjustment operation of adding or subtracting one to or from one of the amounts of correction A1, A2, the amount of correction A1 being an amount determined by the tentative correction amount determination operation module for a light-emitting point (P1) at one end of a first light-emitting chip, the amount of correction A2 being an amount determined by the tentative correction amount determination operation module for a light-emitting point (P2) at an opposite end of a second light-emitting chip adjacent to the first light-emitting chip, the opposite end of the second light-emitting chip being one of two ends closer to the first light-emitting chip, to thereby determine the amount of correction A which satisfies the following formula (1):

$$|\Delta E - B| < \frac{D}{2} \qquad (1)$$

where B is a difference |C1−C2| that is a difference between an amount of shift C1 of a position of the light-emitting point (P1) and an amount of shift C2 of a position of the light-emitting point (P2), ΔE is a value derived from |A1−A2| multiplied by the quantization unit D, in which |A1−A2| is the difference between the amount of correction A1 for the light-emitting point (P1) of the first light-emitting chip and the amount of correction A2 for the light-emitting point (P2) of the second light-emitting chip.

BRIEF DESCRIPTION OF THE DRAWINGS

The above aspect, its advantages and further features of the present invention will become more apparent by describing in detail illustrative, non-limiting embodiments thereof with reference to the accompanying drawings, in which:

FIGS. 13A-13D are schematic diagrams showing an exemplified implementation of an intra-chip adjustment operation within an LED array chip; and FIG. 14 is a flowchart of a modified implementation of the intra-chip adjustment operation.

DESCRIPTION OF EMBODIMENTS

<General Setup of Laser Printer>

Figure 1:
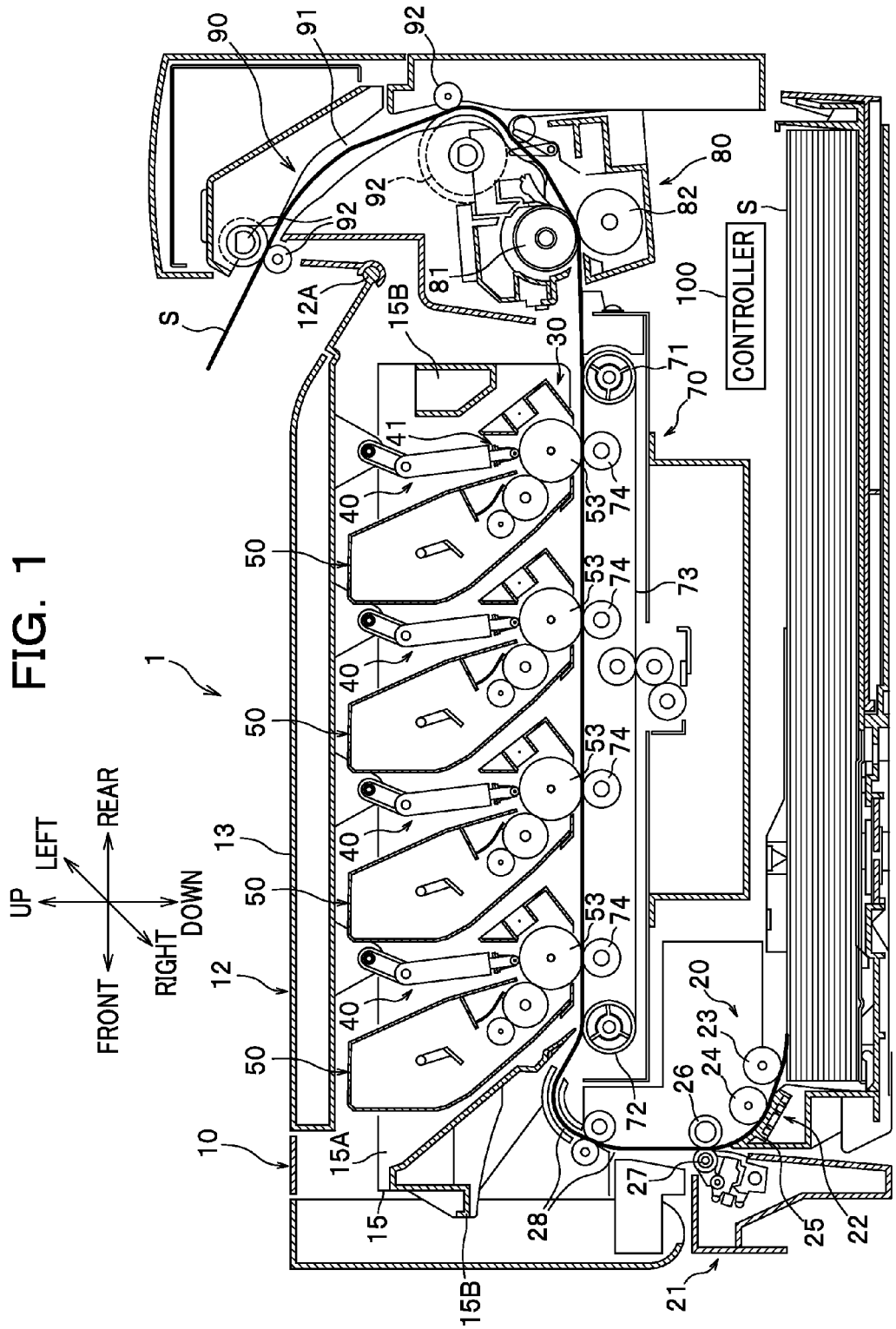
FIG. 1 is a vertical section showing a general configuration of a color printer as an example of an image forming apparatus according to an illustrative embodiment of the present invention.

As shown in FIG. 1, an electrophotographic color printer 1 as an example of an image forming apparatus according to an illustrative embodiment of the present invention includes a body casing 10 and other components housed within the body casing 10 which principally include a sheet feeder unit 20 configured to feed a sheet S (e.g., of paper), an image forming unit 30 configured to form an image on the sheet S fed by the sheet feeder unit 20, a sheet output unit 90 configured to eject the sheet S on which an image has been formed by the image forming unit 30, and a controller 100 configured to control operations of these components. In the following description, the direction is designated as from the viewpoint of a user who is using (operating) the color printer 1. To be more specific, in FIG. 1, the left-hand side of the drawing sheet corresponds to the "front" side of the color printer 1, the right-hand side of the drawing sheet corresponds to the "rear" side of the color printer 1, the back side of the drawing sheet corresponds to the "left" side of the color printer 1, and the front side of the drawing sheet corresponds to the "right" side of the color printer 1. Similarly, the direction of a line extending from top to bottom of the drawing sheet corresponds to the "vertical" or "upward/downward (upper/lower or top/bottom)" direction of the color printer 1.

At an upper portion of the body casing 10, an upper cover 12 is provided. The upper cover 12 is pivoted on the body casing 10 so that the upper side of the body casing 10 can be opened and closed as desired by causing the upper cover 12 to be swung open and closed on a hinge 12A provided at a rear side thereof. An upper surface of the upper cover 12 is configured as a sheet output tray 13 on which sheets S ejected from inside of the body casing 10 are stacked and accumulated. At an undersurface of the upper cover 12, four LED units 40 each configured as an exposure device consistent with the present invention are provided.

In the body casing 10, a cartridge drawer 15 is provided in which a plurality of process cartridges 50 are accommodated in such a manner that each process cartridge 50 is removable from and installable in the cartridge drawer 15. The cartridge drawer 15 includes a pair of right and left side plates 15A (of which only one is illustrated) made of metal and a pair of front and rear cross members 15B connecting the side plates 15A. The side plates 15A are disposed at right and left sides of LED heads 41 each configured as an exposure head consistent with the present invention, and configured to directly or indirectly support and locate photoconductor drums 53 in place. Emission of each LED head 41 is controlled by a controller 100.

The sheet feeder unit 20, provided in a lower space within the body casing 10, principally includes a sheet feed tray 21 removably installed in the body casing 10, and a sheet feed mechanism 22 configured to feed a sheet S from the sheet feed tray 21 to the image forming unit 30. The sheet feed mechanism 22, provided frontwardly of the sheet feed tray 21, principally includes a sheet feed roller 23, a separation roller 24 and a separation pad 25.

In the sheet feeder unit 20 configured as described above, sheets S in the sheet feed tray 21 are separated and fed upward one after another by the sheet feed mechanism 22. Each sheet S thus fed upward is passed through between a paper powder remover roller 26 and a pinch roller 27 so that paper powder is removed from each sheet S. Thereafter, the sheet S is conveyed through a sheet conveyance path 28 in which a direction of conveyance of the sheet S is changed to the rearward, so that the sheet S is provided into the image forming unit 30.

The image forming unit 30 principally includes four LED units 40, four process cartridges 50, a transfer unit 70 and a fixing unit 80.

Figure 2:
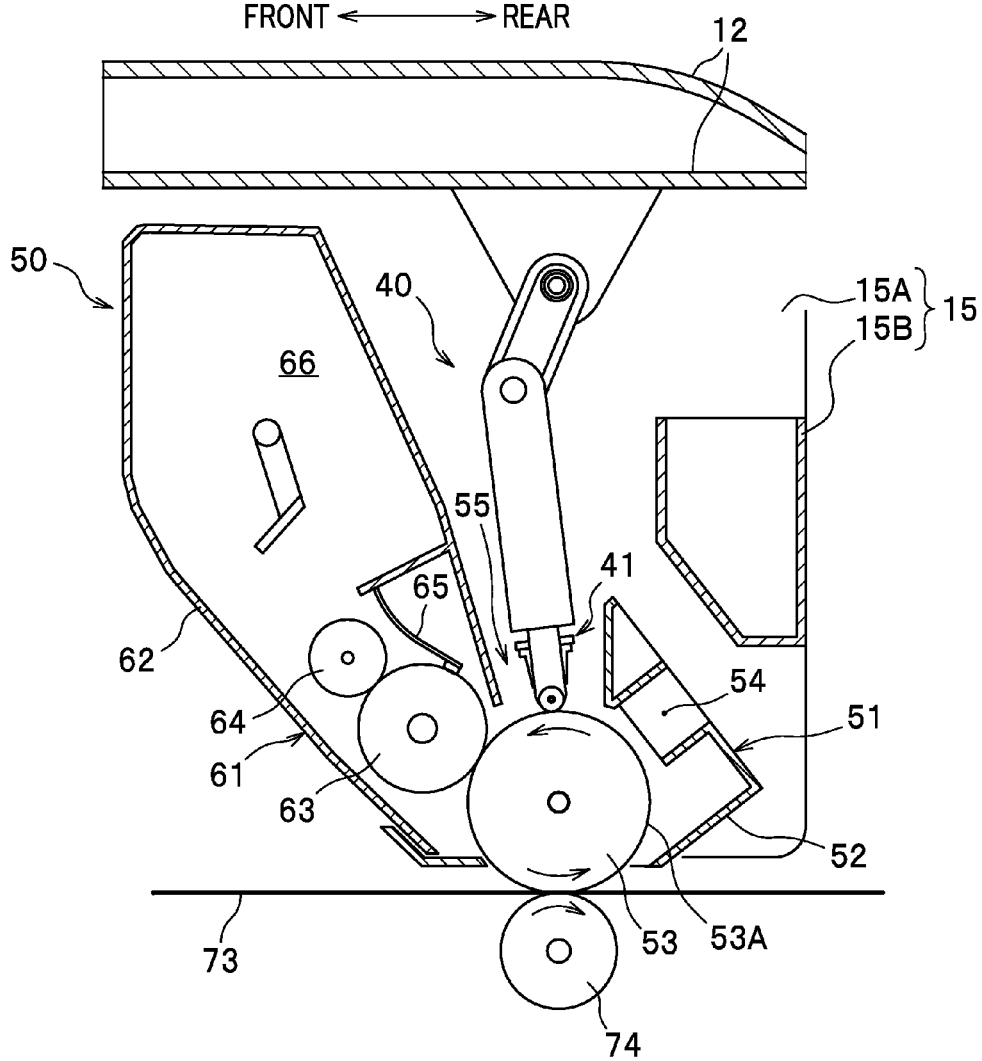
FIG. 2 is an enlarged view of an LED unit and a process cartridge.

The process cartridges 50 are disposed between the upper cover 12 and the sheet feeder unit 20 and arranged in tandem in the front-rear direction. As shown in FIG. 2, each of the process cartridges 50 includes a drum unit 51 and a development unit 61 detachably attached to the drum unit 51. The side plates 15A support the process cartridges 50, and each process cartridge 50 supports a photoconductor drum 53.

The process cartridges 50 are different from each other only in color of toner contained in their toner reservoirs 66, and have the same structure.

The drum unit 51 principally includes a drum frame 52, a photoconductor drum 53 as an example of a photoconductor, and a scorotron charger 54. The photoconductor drum 53 is rotatably supported by the drum frame 52.

The development unit 61 includes a development frame 62, a development roller 63, a supply roller 64, and a doctor blade 65. The development roller 63 and the supply roller 64 are rotatably supported by the development frame 62. The development unit 61 further includes a toner reservoir 66 which contains toner. The process cartridge 50 is configured such that the development unit 61 is attached to the drum unit 51 so that an exposure hole 55 positioned directly above the photoconductor drum 53 is formed between the development frame 62 and the drum frame 52. The LED unit 40 with an LED head 41 held at its lower end is inserted through the exposure hole 55 from above. The structure of the LED head 41 will be described later in detail.

The transfer unit 70 is, as shown in FIG. 1, disposed between the sheet feeder unit 20 and the process cartridges 50, and principally includes a driving roller 71, a driven roller 72, a conveyor belt 73, and transfer rollers 74.

The driving roller 71 and the driven roller 72 are disposed parallel to each other and separate from each other in the front-rear direction. The conveyor belt 73 is an endless belt looped around the driving roller 71 and the driven roller 72. The conveyor belt 73 has an outer surface in contact with each of the photoconductor drums 53. Four transfer rollers 74 are disposed inside the conveyor belt 73 in positions opposite to the corresponding photoconductor drums 53 so that the conveyor belt 73 is held between the transfer rollers 74 and the corresponding photoconductor drums 53. A developing bias is applied to each of the development rollers 74 under a constant-current regulating control scheme during a transfer operation.

The fixing unit 80 is disposed rearward of the process cartridges 50 and the transfer unit 70. The fixing unit 80 principally includes a heating roller 81, and a pressure roller 82 disposed opposite to the heating roller 81 and configured to be pressed against the heating roller 81.

Operation in the image forming unit 30 configured as described above is as follows. First, the surface (photosensitive surface 53A) of each photoconductor drum 53 is uniformly charged by the scorotron charger 54, and then exposed to LED light emitted from the corresponding LED head 41. Thereby, an electric potential of exposed portions is lowered so that an electrostatic latent image based upon image data is formed on the surface of each photoconductor drum 53.

Toner in the toner reservoir 66 is supplied by the rotating supply roller 64 to the development roller 63, and as the development roller 63 rotates, passes through an interface between the development roller 63 and the doctor blade 65 so that a thin layer of toner having a predetermined thickness is carried on the development roller 63.

Toner carried on the development roller 63 is brought into contact with the surface of the photoconductor drum 53 when it comes in a position opposite to the photoconductor drum 53 as the development roller 63 rotates, and then is supplied to the electrostatic latent image formed on the surface of the photoconductor drum 53. Thus, the toner is retained selectively on the photoconductor drum 53, so that the electrostatic latent image is visualized and a toner image is formed by the reversal process.

When a sheet S fed onto the conveyor belt 73 is held and passed through between each photoconductor drum 53 and the corresponding transfer roller 74 disposed at the inside of the conveyor belt 73, the toner image formed on the surface of the photoconductor drum 53 is transferred onto the sheet S.

The sheet S is then passed through between the heating roller 81 and the pressure roller 82 in the fixing unit 80, whereby the toner image transferred on the sheet S is fixed by heat.

The sheet output unit 90 principally includes an output-side sheet conveyance path 91 extending from an outlet of the fixing unit 80 upward and gently turning frontward, and a plurality of pairs of conveyor rollers 92 configured to convey the sheet S along the output-side sheet conveyance path 91. The sheet S on which a toner image is transferred and thermally fixed is conveyed by the conveyor rollers 92 through the output-side sheet conveyance path 91, and ejected out of the body casing 10 and accumulated on the sheet output tray 13.

<Structure of LED Head>

Figure 3:
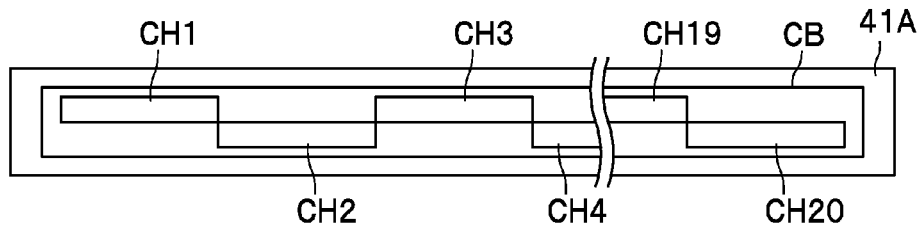
FIG. 3 is a schematic view of the LED unit as viewed from a light-emitting side thereof.

The LED head 41 is a member having a plurality of light-emitting points arranged in a main scanning direction (the direction perpendicular to the direction of transport of a sheet S; in the present embodiment, the right-left direction). The LED head 41 has a light-emitting surface orienting downward to face the photoconductor drum 53. On the light-emitting surface, as shown in FIG. 3, a circuit board CB is provided, on which a plurality of LED array chips $CH_n$ (n is a counting number unique to each LED array chip; n=1, 2, ..., 20), as an example of a plurality of light-emitting chips, are arranged. Each LED array chip $CH_n$ is composed of very small LED elements formed on a surface thereof by a semiconductor process. In the present embodiment, twenty (20) LED array chips $CH_n$ are arranged on the circuit board CB.

Figure 4:
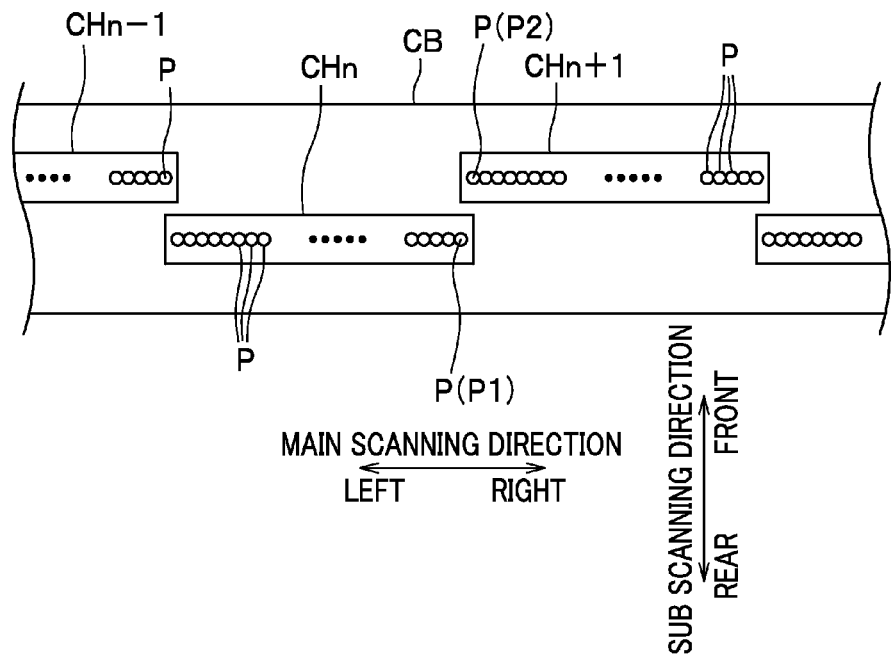
FIG. 4 is an enlarged view of LED array chips provided on the light-emitting side of the LED unit in which light-emitting points are arranged thereon.

As shown in FIG. 4, light-emitting points P formed of the LED elements are arranged densely with a predetermined pitch in a row in the main scanning direction on each LED array chip $CH_n$. Each LED array chip $CH_n$ has, for example, 256 light-emitting points P arranged in the main scanning direction. Due to limitations in fabrication of LED array chip $CH_n$, the light-emitting points P cannot be filled in (i.e., formed at an edge of) each LED array chip $CH_n$. Therefore, in order to achieve uniform pitches between all adjacent light-emitting points P across the chips, the LED array chips $CH_n$ are not aligned with a straight line in the main scanning direction, but arranged such that adjacent LED array chips $CH_n$ are in positions shifted from each other in the sub scanning direction. This makes it possible to arrange a light-emitting point at one end of an LED array chip $CH_n$ (e.g., the light-emitting point P1 at the right end of the LED array chip $CH_n$ in FIG. 4) is in a position shifted in the main scanning direction, by one pitch with which the light-emitting points on every LED array chip are arranged, from a light-emitting point at an opposite end of an adjacent LED array chip $CH_{n+1}$ adjacent to the one end of the LED array chip $CH_n$ (e.g., the light-emitting point P2 at the left end of the LED array chip $CH_{n+1}$ in FIG. 4). In the present embodiment, adjacent LED array chips $CH_n$ are in positions shifted from each other alternately to the front and to the rear (in the sub scanning direction), i.e., in a staggered arrangement. However, such a staggered arrangement is not requisite; for example, an alternative configuration in which each LED array chip $CH_n$ is located in any one of three positions of the center, the front and the rear so that adjacent LED array chips $CH_n$ are shifted from each other in the front-rear direction. It is to be understood that the shift in the sub scanning direction of the position of each light-emitting chip, which will be described in this specification, may include both of an intentionally introduced shift as described above and an error introduced in assembly process, or include only the error introduced in assembly process.

Figure 5:
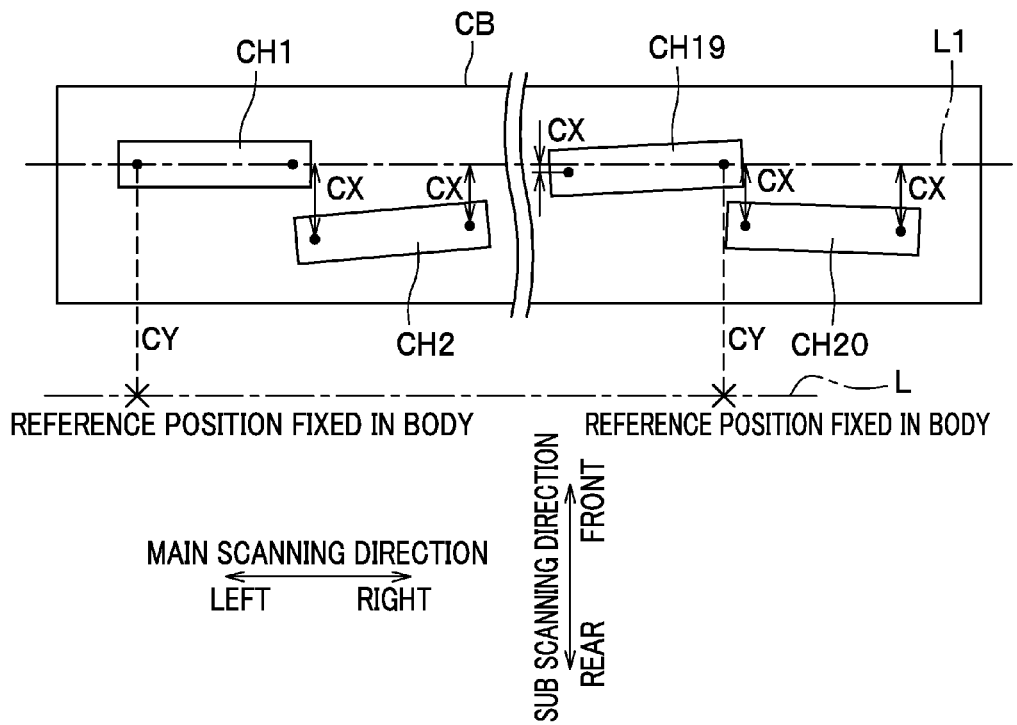
FIG. 5 is an enlarged view of the light-emitting side of the LED unit as illustrated to explain an amount of shift in position of each light-emitting point.

LED array chips $CH_n$ arranged on the circuit board CB are to be in positions such that odd-numbered LED array chips $CH_n$ (n is an odd number) are aligned in a front row and even-numbered LED array chips $CH_n$ (n is an even number) are aligned in a rear row shifted rearwardly a predetermined distance away from the front row. However, when these LED array chips $CH_n$ are actually mounted on the circuit board CB, an error introduced in their assembly process would possibly make the light-emitting points P on the even-numbered LED array chips $CH_n$ out of alignment with a straight line so that they are arranged in positions slightly slanting or shifted in the main scanning direction and/or the sub scanning direction, as shown in FIG. 5. The even-numbered LED array chips $CH_n$ would also suffer from an error introduced in their assembly process, and could be difficult to mount precisely in positions shifted rearwardly the predetermined distance away from the front row of the odd-numbered LED array chips $CH_n$ on the circuit board CB. As a result, disadvantageously, the distance of the even-numbered LED array chips $CH_n$ from the front row of the odd-numbered LED array chips $CH_n$ could vary, and the direction of arrangement of the light-emitting points P would slant with respect to the main scanning direction to some extent.

Under the circumstances, for the purpose of achieving exposure (scanning) of the surface of the photoconductor drum 53 to light accurately along a straight line extending in the main scanning direction, emission timing of each light-emitting point P should be adjusted with consideration given to the aforementioned error in the arrangement of the LED array chips $CH_n$. Accordingly, an amount of shift C (from a reference line L1 extending in the main scanning direction) is stored in advance for each light-emitting point P, and the light-emitting point P is caused to give off light emission at a time shifted from a reference time by an amount of time corresponding to the stored amount of shift C, so that an accurate exposure is performed. Since an mount of shift CX of each light-emitting point P from the reference line L1 as determined relative to the LED head 41 and an amount of shift CY of the reference line L1 from a reference position fixed to the body casing 10 (in this embodiment, the amount of shift CY is defined from measurements conducted for light-emitting points P selected from those of two LED array chips $CH_n$ located substantially at the right and left ends) would both affect the amount of shift C, this amount of shift C of each light-emitting point P is determined by adding the amount of shift CX to the calculated amount of shift CY of the reference line L1 from the reference position of the body casing 10 (i.e., reference line L which is a straight line as shown in FIG. 5). The amount of shift CX determined from the position of the LED head 41 itself is an amount measured in advance and stored in a memory 49 (see FIG. 7) of the LED head 41. The amount of shift C includes an amount of an error introduced in assembly process of the LED unit 40 with respect to the reference line L, and is stored in a memory 109.

In the present embodiment, the reference line L1 is defined as a straight line connecting a leftmost light-emitting point located at a left end of an LED array chip $CH_1$ located leftmost of the LED array chips $CH_n$ and a rightmost light-emitting point located at a right end of an LED array chip $CH_{19}$ located rightmost of the LED array chips $CH_n$ located in the same front row as that in which the LED array chip $CH_1$ is aligned. Namely, the reference line L1 is determined with respect to positions of two light-emitting points determined after the LED array chips $CH_n$ are mounted on the circuit board CB. It is however to be understood that the determination of the reference line L1 may be made differently without limitation where appropriate.

The present embodiment is configured such that each light-emitting point P is caused to give off light emission at a time shifted by an amount of time corresponding to the amount of shift C as described above, and thus the properly adjusted timing is stored as an amount of correction A in a memory. This amount of correction A may be stored in any memory (storage device) disposed at any position in the color printer 1. For example, in this embodiment, the amount of correction A is stored in a memory 109 that is implemented in the controller 100 as shown in the block diagram of FIG. 7.

Figure 6:
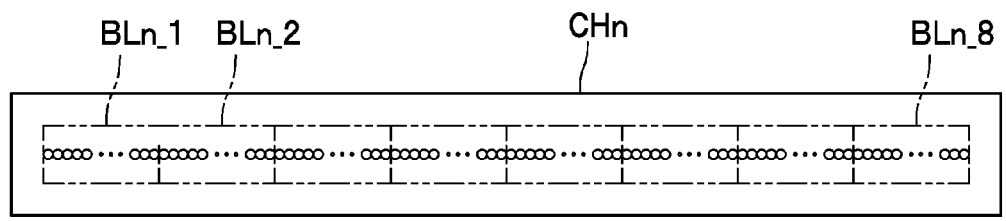
FIG. 6 is an enlarged view of an LED array chip illustrated to explain a plurality of light-emitting point blocks thereon.

The amount of correction A may be determined and stored for each light-emitting point P on one-to-one basis, but a plurality of light-emitting points P may be grouped; rather, considering the number of light-emitting points being so large, it may be advantageously simple and easy to handle respective groups of light-emitting points P, without handling respective light-emitting points P, in view of the processing of control. To be more specific, as shown in FIG. 6, one LED array chip $CH_n$ may be divided into a plurality of light-emitting point blocks $BL_{n\_i}$ (i=1, 2, ..., 8) of light-emitting points P each contiguously arranged in the main scanning direction. By way of example, in the present embodiment, one LED array chip $CH_n$ consisting of 256 light-emitting points P is divided into 8 groups each consisting of 32 light-emitting points P, and each light-emitting point group is referred to as a light-emitting point block $BL_{n\_i}$ (i=1, 2, . . . , 8). Here, n denotes a counting number corresponding to the number n unique to each LED array chip $CH_n$, and i denotes a counting number unique to each light-emitting point block $BL_{n\_i}$ in the LED array chip $CH_n$. As described above, arrangement of the plurality of light-emitting points P within each LED array chip $CH_n$ is accurate, and thus an amount of shift in the sub scanning direction of the position of one light-emitting point P from the position of another light-emitting point P adjacent thereto is very small. It is also to be understood that even if 32 light-emitting points P in each light-emitting point block $BL_{n\_i}$ are handled together, an amount of shift in the sub scanning direction of the position of one light-emitting point P from the position of another light-emitting point P adjacent thereto as would result from a slanting arrangement of the LED array chip $CH_n$ should be very small as well, because the length in the main scanning direction of each light-emitting point block $BL_{n\_i}$ is very small. In this respect, simultaneous emission of a plurality of light-emitting points P contiguously arranged in one light-emitting point block $BL_{n\_i}$ would exert no substantial influence, and thus the present embodiment is configured such that the one amount of correction A is assigned to each light-emitting point block $BL_{n\_i}$ and all the 32 light-emitting point P in the same light-emitting point block $BL_{n\_i}$ are caused to give off light emission at the same time determined with this amount of correction A. In other words, in the present embodiment, the plurality of light-emitting points P within each light-emitting chip $CH_n$ are grouped into a plurality of light-emitting point blocks $BL_{n\_i}$ of contiguously arranged light-emitting points P, and the amount of correction A to be stored in the memory 109 is determined to have a single value for each light-emitting point block $BL_{n\_i}$. Namely, the amount of correction A determined in an emission timing determination unit 110, which will be described later, has a single value for each light-emitting point block $BL_{n\_i}$. Furthermore, the aforementioned amount of shift C to be stored in the memory 109 for use in determination of the amount of correction A may also be determined to have a single value for each light-emitting point block $BL_{n\_i}$.

Figure 7:
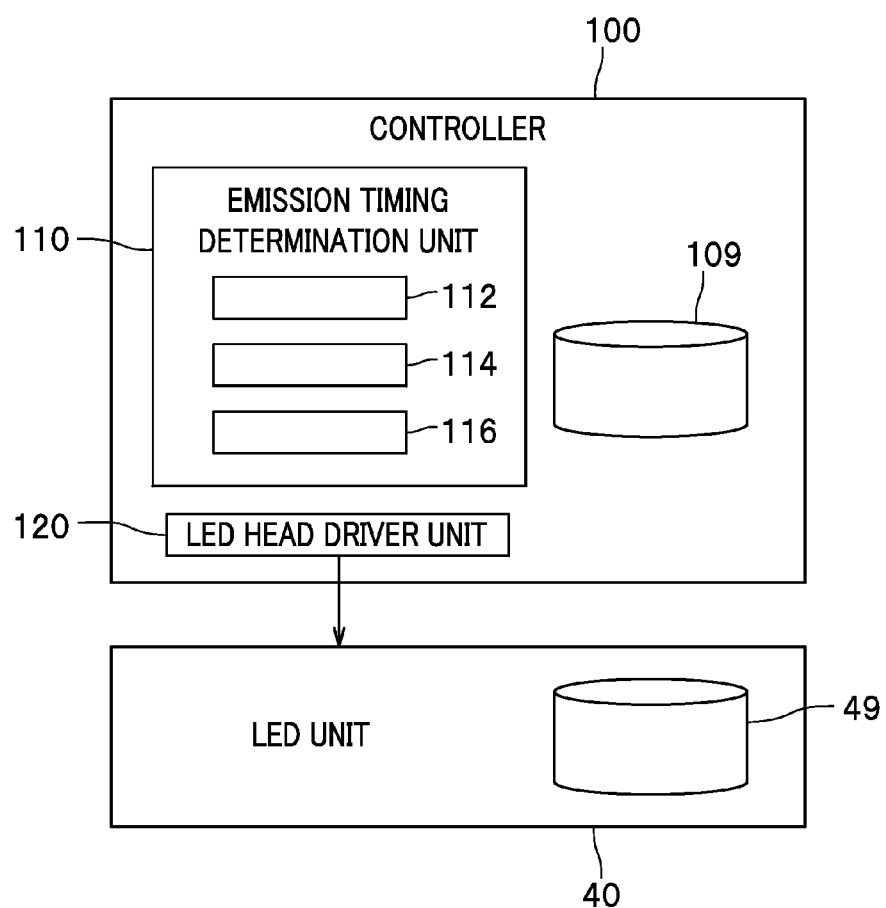
FIG. 7 is a functional block diagram of a controller and an LED unit.

As shown in FIG. 7, the controller 100 includes an emission timing determination unit 110, an LED head driver unit 120, and a memory 109. The emission timing determination unit 110 and the LED head driver unit 120 are functional units involving the emission control of the LED unit 40. The controller 100 is comprised of a central processing unit or CPU, a read-only memory or ROM, a random-access memory or RAM, and an input/output interface which operate in accordance with programs provided in advance, and is configured to implement these units 110, 120.

The emission timing determination unit 110 is, as will be described later in detail, configured to determine a quantized amount of correction A to be applied to emission timing with which the light-emitting points P of each light-emitting point block $BL_{n\_i}$ are to be caused to give off light emission so that points of exposure to light emitted from the light-emitting points P are aligned substantially with a straight line extending in the main scanning direction on the photosensitive surface 53A of the photoconductor drum 53.

The LED head driver unit 120 is configured as an example of an exposure head driver to cause the light-emitting points P of each light-emitting point block $BL_{n\_i}$ to give off light emission at a time shifted from a reference time by an amount of time corresponding to the amount of correction A determined by the emission timing determination unit 110 for each light-emitting point block $BL_{n\_i}$. This reference time is, for example, in this embodiment, predetermined as a time at which a specific light-emitting point P used to determine the reference line L1 is caused to give off light emission.

The memory 109 is provided to hold various constants, parameters, printing data and the like necessary for the entire operation of the color printer 1, as well as the amounts of shift C and the amounts of shift CY described above. The amounts of shift C are values determined based on the amounts of shift CX as stored in the memory 49 with consideration given to the amounts of shift CY. The amounts of shift CY are values which varies to some extent each time when the cover 2 is opened and closed, and thus may be obtained each time when a known patch test is performed for correction of color misalignment after the cover 2 is closed, through an exposure test conducted by causing two light-emitting points P selected for determination of the reference line L1 from those of two LED array chips $CH_n$ located substantially at the both ends of the circuit board CB to give off light emission.

The emission timing determination unit 110, as shown in FIG. 7, includes a tentative correction amount determination operation module 112, an inter-chip adjustment operation module 114 and an intra-chip adjustment operation module 116.

The tentative correction amount determination operation module 112 is configured to tentatively determine an amount of correction A for each light-emitting point P based on a quotient obtained by dividing the amount of shift C stored in the memory 109 by a quantization unit D. In a simplest implementation, the quotient obtained by dividing the amount of shift C by the quantization unit D is simply determined as the amount of correction A in the tentative correction amount determination operation module 112. It is to be understood that the thus-obtained quotient may be adjusted by addition or multiplication of any appropriate constant as desired.

The inter-chip adjustment operation module 114 is configured to perform an inter-chip adjustment operation of checking the amounts of shift in position between two points of exposure to light emitted from the opposite light-emitting points P of adjacent LED array chips $CH_n$ after the tentative amount of correction A is obtained and tentatively applied thereto, to thereby adjust the amounts of correction A.

The intra-chip adjustment operation module 116 is configured to perform an intra-chip adjustment operation of adjusting the amounts of shift in position between adjacent points of exposure to light emitted from the opposite light-emitting points P of each light-emitting point block $BL_{n\_i}$ within each LED array chip $CH_n$ after the inter-chip adjustment operation is performed.

Figure 10:
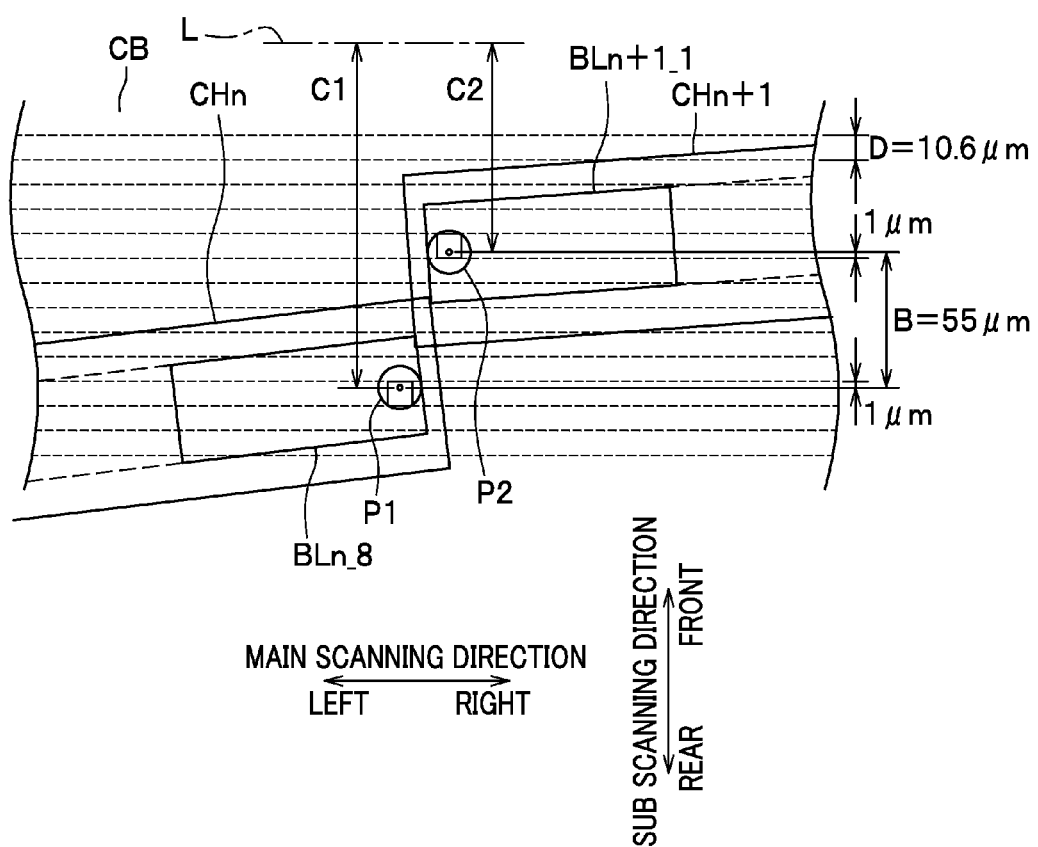
FIG. 10 is a schematic diagram showing adjacent points of exposure to light emitted by adjacent light-emitting points at opposite ends of adjacent chips, illustrated to explain a shift (gap) in position of each of the light-emitting points at the opposite ends of the adjacent chips.

To be more specific, as shown in FIGS. 5 and 10, the inter-chip adjustment operation module 114 is configured to perform, if the following formula (1) is not satisfied for each pair of tentatively determined amounts of correction A1, A2, an inter-chip adjustment operation of adding or subtracting one to or from one of the amounts of correction A1, A2, the amount of correction A1 being an amount determined by the tentative correction amount determination operation module 112 for a light-emitting point block $BL_{n\_8}$ (light-emitting point P1) at one end (e.g. right end) of a first LED array chip $CH_n$, the amount of correction A2 being an amount determined by the tentative correction amount determination operation module 112 for a light-emitting point block $BL_{n+1\_1}$ (light-emitting point P2) at an opposite end (i.e., left end) of a second LED array chip $CH_{n+1}$ adjacent to the first LED array chip $CH_n$, the opposite end of the second LED array chip $CH_{n+1}$ being one of two ends closer to the first LED array chip $CH_n$, to thereby determine the amount of correction A which satisfies the following formula (1):

$$|\Delta E - B| < \frac{D}{2} \quad (1)$$

where B is a difference $|C1-C2|$ that is a difference between an amount of shift C1 of a position of the light-emitting point block $BL_{n\_8}$ (light-emitting point P1) and an amount of shift C2 of a position of the light-emitting point block $BL_{n+1\_1}$ (light-emitting point P2), $\Delta E$ is a value derived from $|A1-A2|$ multiplied by the quantization unit D, in which $|A1-A2|$ is the difference between the amount of correction A1 for the light-emitting point block $BL_{1\_8}$ (light-emitting point P1) of the first LED array chip $CH_n$ and the amount of correction A2 for the light-emitting point block $BL_{n+1\_1}$ (light-emitting point P2) of the second LED array chip $CH_{n+1}$. Whether addition or subtraction of one is applied to the one of the tentative amount of correction A1, A2 may be determined by comparing the values obtained by the operations of addition and subtraction. By performing this inter-chip operation, widening of a gap between two light-emitting points P between opposite (abutting) ends of each pair of adjacent LED array chips $CH_n$, $CH_{n+1}$ can be suppressed.

The intra-chip adjustment operation module 116 is configured to perform, if the following formula (2) is not satisfied after the operation of the inter-chip adjustment operation, an intra-chip adjustment operation of adding or subtracting one to or from an amount of correction for at least one light-emitting point block $BL_{n\_i}$, (i=2, 3, . . . , or 7) other than the light-emitting point blocks $BL_{n\_1}$, $BL_{n\_8}$ at both ends of each LED array chip $CH_n$, the intra-chip adjustment operation being repeated until the following formula (3) is satisfied for every pair of adjacent light-emitting point blocks $BL_{n\_i}$, $BL_{n\_i+1}$ within the LED array chip $CH_n$:

$$|\Delta E_{n\_1,2} - B_{n\_1,2}| < D \quad (2)$$

$$|\Delta E_{n\_i,i+1} - B_{n\_i,i+1}| < D \quad (3)$$

where $|\Delta E_{n\_1,2} - B_{n\_1,2}|$ is an amount of shift in the sub scanning direction of a position between a point of exposure to light to be emitted from a light-emitting point P of the light-emitting point block $BL_{n\_1}$ at one end of an nth LED array chip $CH_n$ and an amount of shift in the sub scanning direction of a position of a point of exposure to light to be emitted from a light-emitting point P of a light-emitting point block $BL_{n\_2}$ adjacent inwardly to the light-emitting point block $BL_{n\_1}$ at the one end of the nth LED array chip $CH_n$, and D is the quantization unit as an example of a predetermined threshold value F, wherein $\Delta E_{n\_i,i+1} = |A_{n\_i} - A_{n\_i+1}| \times D$ where $A_{n\_i}$ is an amount of correction of the position of an ith light-emitting point block $BL_{n\_i}$ on the nth LED array chip $CH_n$, and $B_{n\_i,i+1} = C_{n\_i} - C_{n\_i+1}$ where $C_{n\_i}$ is an amount of shift of a position of the ith light emitting point block $BL_{n\_i}$ on the nth LED array chip $CH_n$. By performing this intra-chip adjustment operation, even when the positions of adjacent light-emitting point blocks $BL_{n\_i}$, $BL_{n\_i+1}$ within each LED array chip $CH_n$ are shifted from each other to some normegligible extent as a result of the inter-chip adjustment operation, such a shift can be corrected by adjustment in the amounts of correction A made at positions where a shift in the position of the point of exposure is relatively not conspicuous.

Operation of determination of amounts of correction A and its advantageous effects implemented in the color printer 1 configured as described above will now be described with reference to the flowcharts of FIGS. 8 and 9 and the schematic diagrams of FIGS. 10-13.

Figure 11:
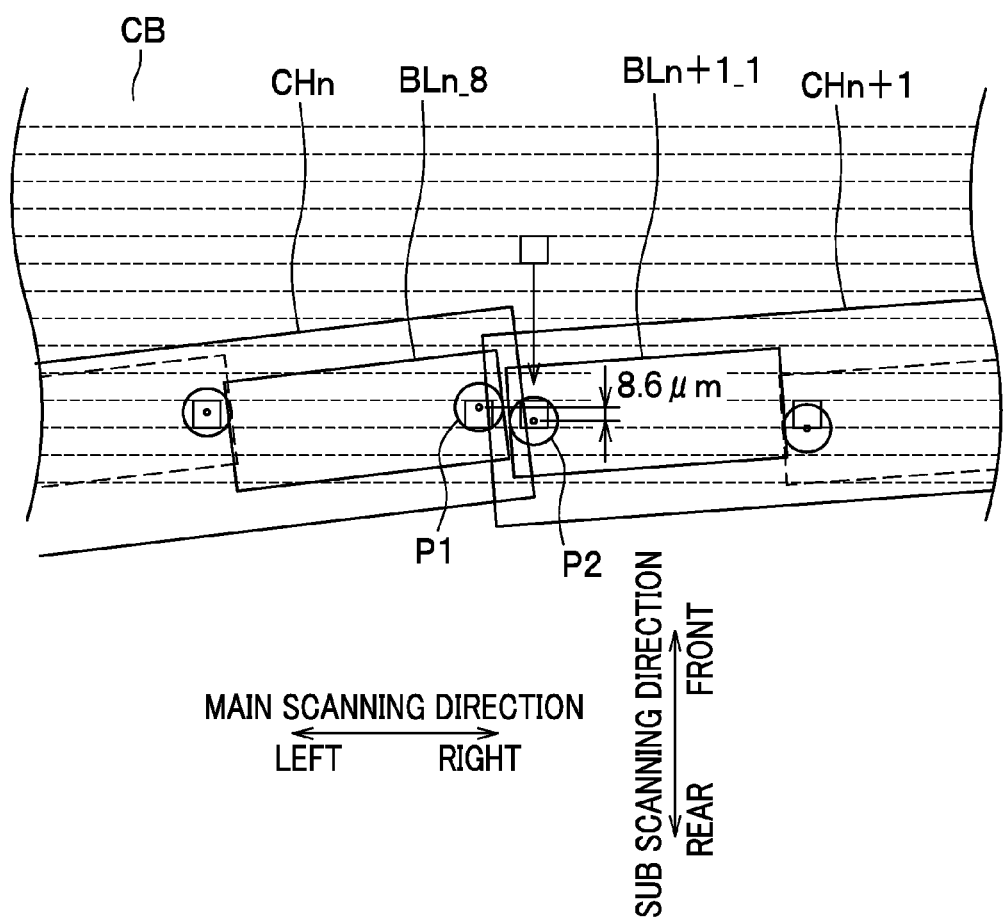
FIG. 11 is a schematic diagram showing adjacent points of exposure to light emitted by the adjacent light-emitting points at opposite ends of the adjacent chips of FIG. 10, illustrated to explain a relatively large gap (difference between amounts of shift in position), which would be exhibited due to quantization error, between the adjacent points of exposure to light emitted by the light-emitting points of which emission timings are corrected by an quantized amounts of correction.

Before describing the operation of the color printer 1 configured according to the present embodiment, problems associated with the existing method of determination of amounts of correction A will be described with reference to FIGS. 10 and 11.

As shown in FIG. 10, LED array chips $CH_n$, $CH_{n+1}$ mounted on a circuit board CB are arranged in positions such that adjacent LED array chips $CH_n$, $CH_{n+1}$ are shifted from each other in position in the sub scanning direction. It is to be understood that adjacent LED array chips $CH_n$, $CH_{n+1}$ being in positions close to each other in the drawing are illustrated to overlap each other as a matter of convenience for clarity of illustration, but in actuality they are mounted in positions shifted from each other so as not to overlap each other.

In the drawings, stripes drawn by broken lines are arranged equidistantly at intervals of the quantization unit D. The stripes are illustrated for the purpose of visualizing the pitches of shifting in the sub scanning direction of the position of the point of exposure to light emitted from each light-emitting point P, by the quantized amount of correction A. In this description, the stripes drawn by the broken lines (regions between two adjacent stripes) are referred to as "quantization unit stripes" for convenience' sake.

Let us suppose that the quantization unit D is, for example, 10.6 μm and a difference B between an amount of shift C1 in the sub scanning direction of the position of a light-emitting point P1 located at the right end of the light-emitting point block $BL_{n\_8}$ and an amount of shift C2 in the sub scanning direction of the position of a light-emitting point P2 located at the left end of the light-emitting point block $BL_{n\_i}$ (=|C1−C2|) is 55 μm. When these two light-emitting points P1, P2 are caused to give off light emission at times shifted from each other by an amount of time corresponding to the quantized amount of correction A, the points of exposure to light emitted from these light-emitting points P1, P2 may be shifted in position by a multiple of 10.6 respectively. On the other hand, the remainder of division of the amount of shift C (55 μm) by 10.6 is 2, and thus the amount of shift in position between the points of exposure after correction is expected to be 2 μm or so.

Figure 12:
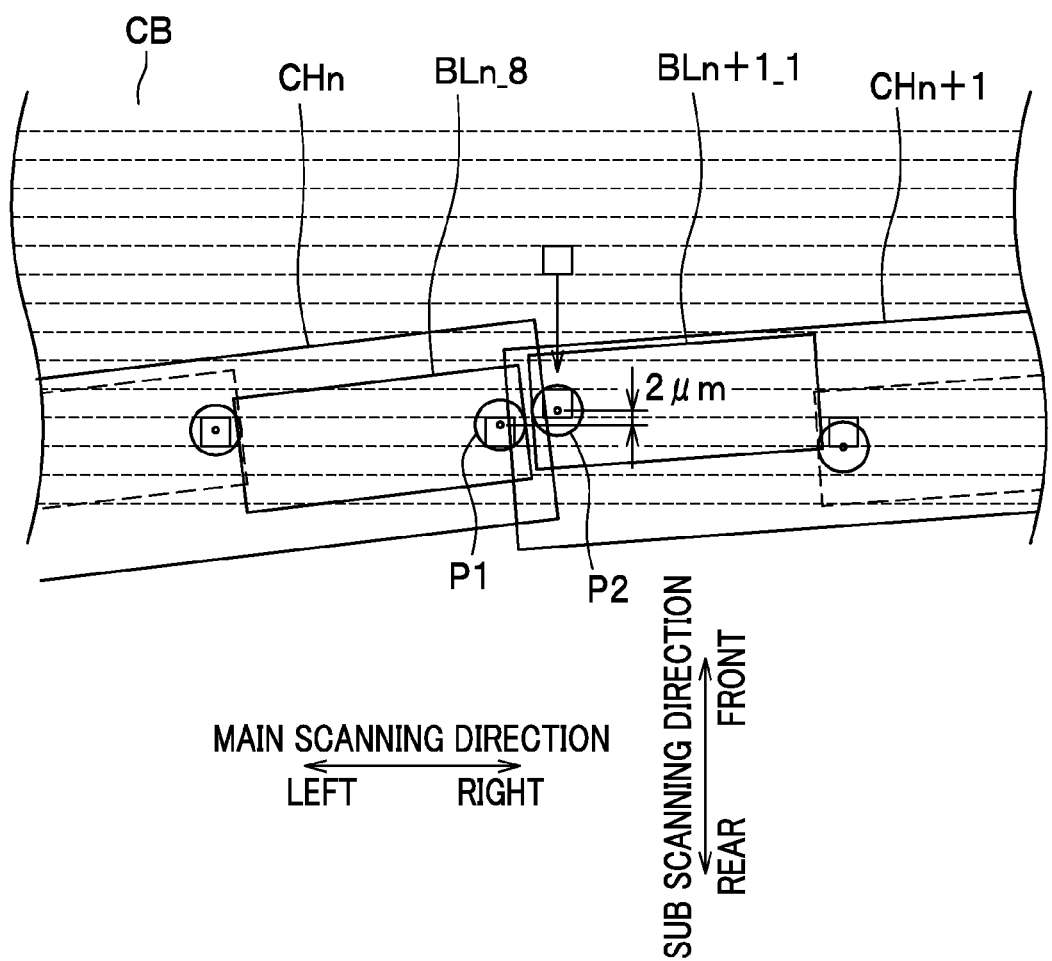
FIG. 12 is a schematic diagram showing adjacent points of exposure to light emitted by the adjacent light-emitting points at opposite ends of adjacent chips of FIG. 10, illustrated to explain adjusted positions of the adjacent points of exposure as a result of an inter-chip adjustment operation applied to the adjacent chips of FIG. 10 to adjust emission timing with which the adjacent light-emitting points are to be caused to give off light emission.

However, when the light-emitting points P1, P2 (centers of spots to be exposed to light emitted therefrom) are located in positions relative to the quantization unit stripes as shown in FIG. 10, the actual points of exposure to light emitted from the light-emitting points P1, P2, if assigned simply to the pixel positions (quantized positions indicated by squares) on the quantization unit stripes, would be shifted in position from each other by an amount greater than 2 μm after correction. To be more specific, in the case of the light-emitting points P1, P2 being positioned as shown in FIG. 10, the light-emitting point P1 is in a position shifted rearwardly by 1 μm from a border line of the quantization unit stripe, and the light-emitting point P2 is in a position shifted frontwardly by 1 μm from a border line of the quantization unit stripe. In this case, since the light-emitting point P1 and the light-emitting point P2 are in positions shifted from each other by an amount corresponding to 6 pixels defined by the quantization unit stripes (by 6 units), the amount of correction A would be set to 6, so that the points of exposure to light emitted from the light-emitting points in the light-emitting point block $BL_{n\_1}$ are shifted in position rearwardly by 6 units (or the points of exposure to light emitted from the light-emitting points in the light-emitting point block $BL_{n\_8}$ are shifted in position frontwardly by 6 units). As a result, the points of exposure to light emitted from the light-emitting points P1, P2 are located within the same quantization unit stripe as shown in FIG. 11, but the amount of shift in position in the sub scanning direction between the point of exposure to light emitted from the light-emitting point P1 and the point of exposure to light emitted from the light-emitting point P2 within the quantization unit stripe would become 8.6 μm (=10.6 μm−1 μm−1 μm). This value is greater than the expected amount of shift in position (i.e., 2 μm). In this case, points of exposure to light emitted from the light-emitting points in the light-emitting point block BLn_1 may be shifted in position by 5 units, instead of 6 units, so that the amount of shift in position in the sub scanning direction between the point of exposure to light emitted from the light-emitting point P1 and the point of exposure to light emitted from the light-emitting point P2 will become 2 μm as shown in FIG. 12. In the color printer 1 configured in accordance with the present embodiment, such an amount of shift in position between the points of exposure as mentioned above is checked, and the amount of shift in position between the adjacent light-emitting point blocks $BL_{n\_8}, BL_{n+1\_1}$ located at the opposite (abutting) ends of two adjacent LED array chips $CH_n, CH_{n+1}$ can be prevented from becoming greater.

Figure 8:
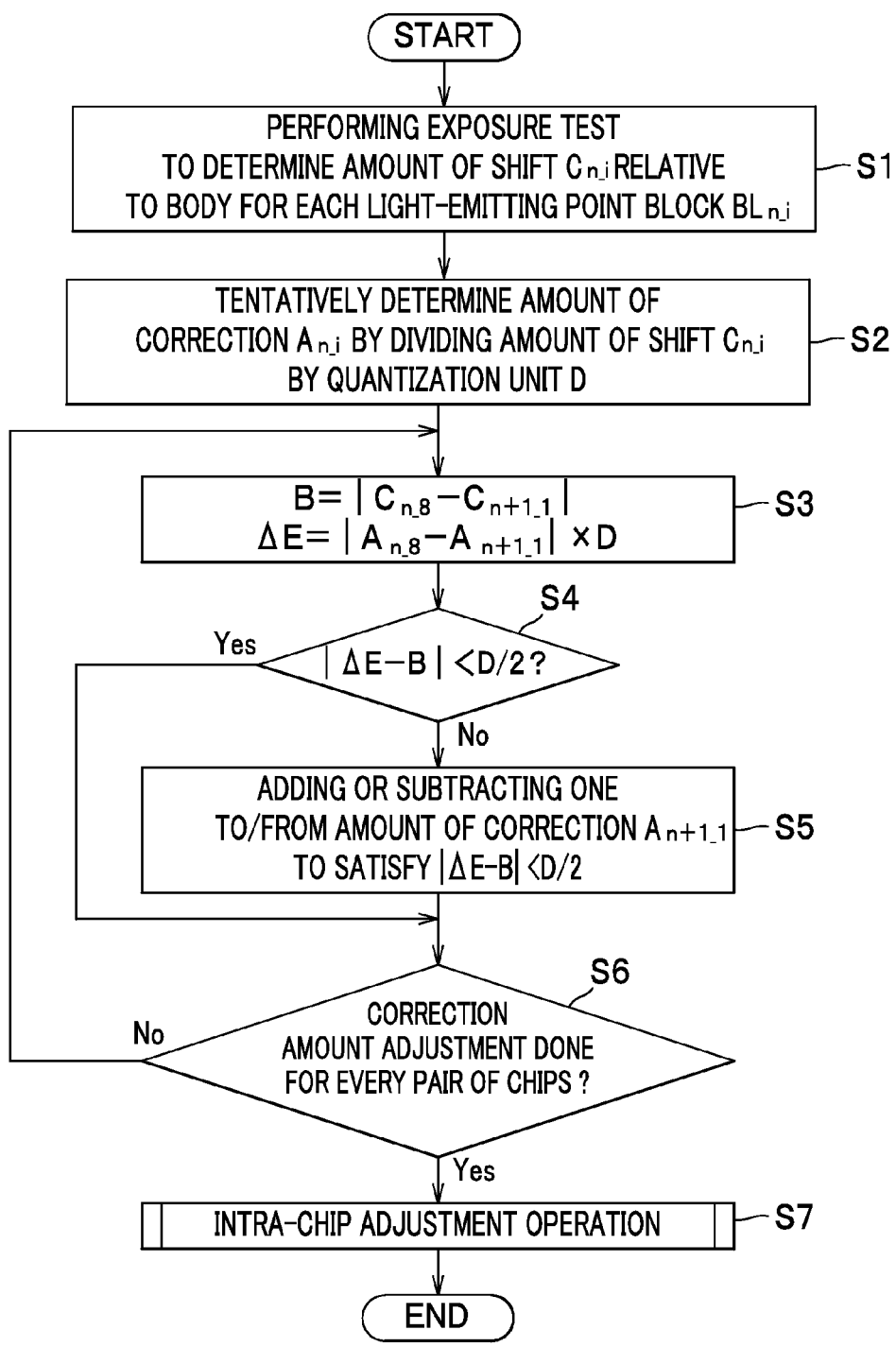
FIG. 8 is a flowchart of an inter-chip adjustment operation for determination of an amount of correction for each of light-emitting point blocks at opposite ends of adjacent chips.
Figure 9:
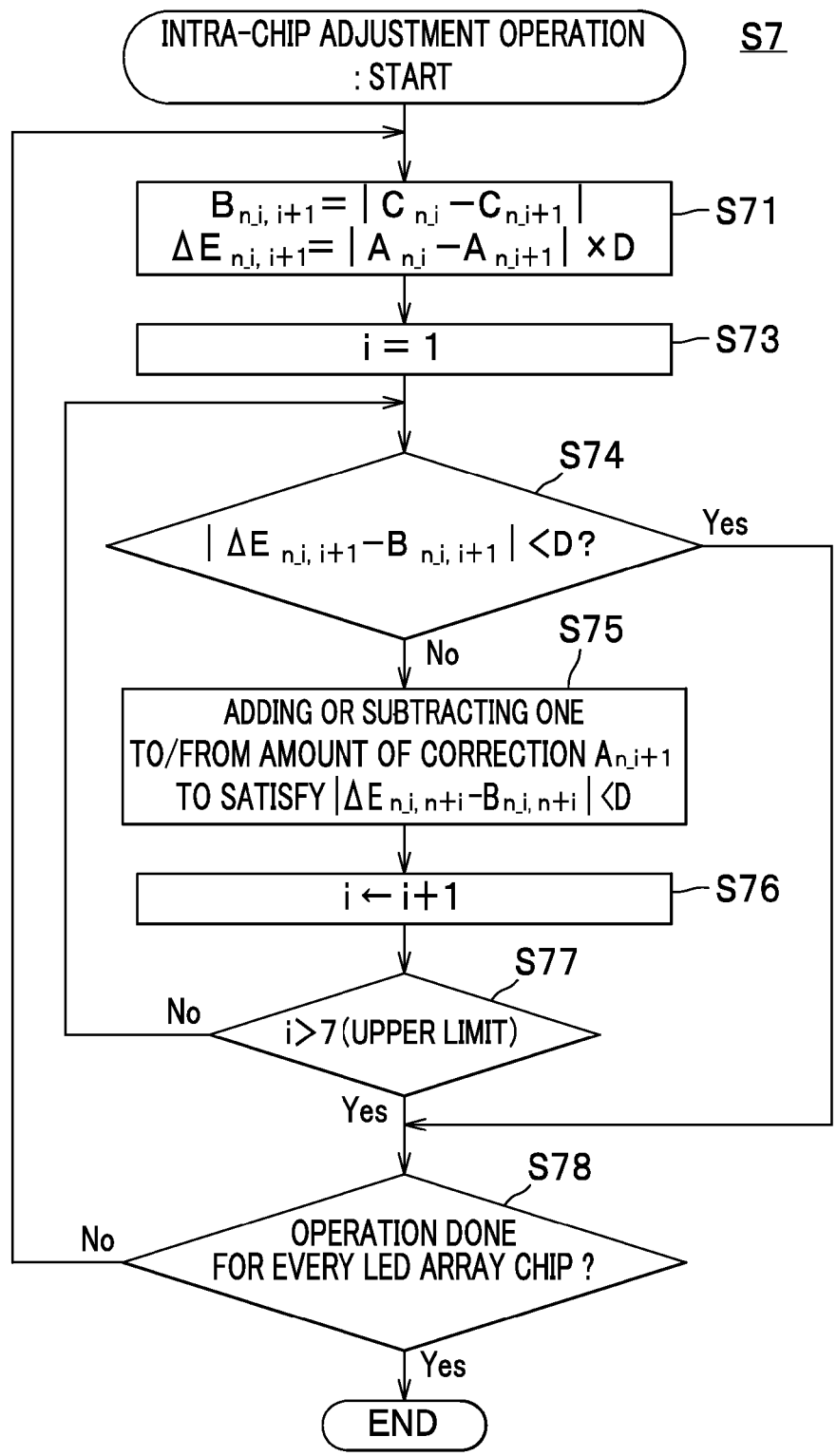
FIG. 9 is a flowchart of an intra-chip adjustment operation for determination of an amount of correction for at least one of light-emitting point blocks other than the light-emitting point blocks at the both ends of each chip.

Referring now to FIGS. 8 and 9, operation of the color printer 1 according to the present embodiment will be described in detail.

As shown in FIG. 8, first, the controller 100 performs an exposure test when a predetermined condition is satisfied (e.g., at a time when the cover 2 is closed), and measures amounts of shift CY to determine an amount of shift $C_{n\_i}$ relative to the body casing 10 (body) for each light-emitting point block $BL_{n\_i}$ (S1). This amount of shift $C_{n\_i}$ determined in step S1 is stored in the memory 109.

Then, the controller 100 (the tentative correction amount determination operation module 112 of the emission timing determination unit 110) tentatively determines an amount of correction $A_{n\_i}$ for each light-emitting point block $BL_{n\_i}$ by dividing the amount of shift $C_{n\_i}$ by the quantization unit D (S2).

Next, the controller 100 (the inter-chip adjustment operation module 114 of the emission timing determination unit 110) calculates a difference B between the amounts of shift C1, C2 of adjacent light-emitting point block $BL_{n\_8}, BL_{n+1\_1}$ ($B=|C_{n\_8}-C_{n+1\_1}|$), and an amount of relative shifting ΔE of points of exposure emitted from light-emitting points of the light-emitting point blocks $BL_{n\_8}, BL_{n+1\_1}$ resulting from correction made with the tentatively determined amounts of correction $A_{n\_8}, A_{n+1\_1}$ (i.e., ΔE is a difference between the amounts of correction $A_{n\_8}, A_{n+1\_1}$ multiplied by the quantization unit D: $\Delta E=|A_{n\_8},-A_{n+1\_1}|$) (S3). Subsequently, the controller 100 makes a determination as to whether or not a difference of these calculated values |ΔE−B| is smaller than D/2 (S4), and if |ΔE−B| is smaller than D/2 (Yes in step S4), then the process skips step S5 and goes to step S6, while if |ΔE−B| is not smaller than D/2 (No in step S4), then the controller 100 adds or subtracts one to or from the amount of correction $A_{n+1\_1}$ for the right light-emitting point block $BL_{n+1\_1}$, so that the formula (1), |ΔE−B|<D2, is satisfied (S5).

By performing steps S3 to S5 in one cycle, a correction amount adjustment is completed for one pair of adjacent LED array chips $CH_n, CH_{n+1}$ (inter-chip adjustment operation) which is made at the adjacent light-emitting point blocks $BL_{n\_8}, BL_{n+1\_1}$. Thus, in step S6, the controller 100 makes a determination as to whether or not such an inter-chip adjustment operation reaches completion for every pair of adjacent LED array chips $CH_n, CH_{n+1}$ (i.e., at every pair of adjacent light-emitting point blocks $BL_{n\_8}, BL_{n+1\_1}$ of the adjacent LED array chips $CH_n, CH_{n+1}$), and if the inter-chip adjustment operation still does not reach completion for every pair of adjacent LED array chips $CH_n, CH_{n+1\_1}$ (No in step S6), then the steps S3 to S5 are repeated, while if the inter-chip adjustment operation reaches completion for every pair of adjacent LED array chips $CH_n, CH_{n+1}$ (Yes in step S6), then the process goes to step S7 in which an intra-chip adjustment operation is performed.

With these steps S1-S6 performed as described above, as shown in FIGS. 10 and 11, even when the adjacent light-emitting point blocks $BL_{n\_8}, BL_{n+1\_1}$ located at the opposite (abutting) ends of two adjacent LED array chips $CH_n, CH_{n+1}$ are in positions such that the tentatively corrected positions of the points of exposure emitted from the light-emitting points of these light-emitting point blocks $BL_{n\_8}, BL_{n+1\_1}$ are still shifted in the sub scanning direction significantly, the gap between the positions in the sub scanning direction of the points of exposure to light emitted from the light-emitting points P of the light-emitting point blocks $BL_{n\_8}, BL_{n+1\_1}$ of two adjacent LED array chips $CH_n, CH_{n+1}$ can be reduced to a value not greater than the half of the quantization unit D, as shown in FIG. 12, because the gap between the positions in the sub scanning direction of the points of exposure (|ΔE−B|) is calculated and if the calculated gap is too great (|ΔE−B|<D/2), an adjustment is made to make the gap smaller as shown in FIG. 12.

Next discussion extended with reference to FIGS. 9 and 13 will focus on the intra-chip adjustment operation mentioned above.

FIG. 13A shows a state in which points of exposure to light emitted from the light-emitting points P of the LED array chips $CH_{n\_1}, CH_n$ are shifted in position by an amount corresponding to several units. FIG. 13B shows a state in which a difference between the amounts of shift in position of the points of exposure to light emitted from the rightmost light-emitting point P1 of the rightmost light-emitting point block $BL_{n-1\_8}$ of the LED array chip $CH_{n-1}$ and the leftmost light-emitting point P2 of the leftmost light-emitting point block $BL_{n\_1}$ of the LED array chip $CH_n$ adjacent to the LED array chip $CH_{n\_1}$ are made smaller by performing the tentative correction amount determination operation and the inter-chip adjustment operation. After the inter-chip adjustment operation, the gap (position shift amount difference) between the points of exposure to light emitted from the light-emitting point P1 and the light-emitting point P2 is made smaller; however, an inter-block light-emitting point pair (P3, P4) located inwardly next to the inter-block light-emitting point pair (P1, P2) are affected by this correction (inter-chip adjustment), and consequently the gap (position shift amount difference) between the points of exposure to light emitted from the light-emitting point P3 and the light-emitting point P4 becomes greater. In the intra-chip adjustment operation, the gap between the points of exposure within the chip, which would become greater as a result of the inter-chip adjustment operation, is adjusted at one or more of abutting ends of adjacent light-emitting point blocks of which the gaps between adjacent points of exposure are relatively small, i.e., by adjusting the amounts of shift in position of points of exposure so that the gap between adjacent points of exposure will not exceed a predetermined threshold F. To be more specific, referring to FIG. 13B which shows the state after the inter-chip adjustment operation, points of exposure to light emitted from the rightmost and leftmost light emitting points P3, P4, P5, P6 . . . at the right and left ends of the light-emitting point blocks $BL_{n\_i}$ in the LED array chips $CH_n$ are located in positions such that there may be pairs of points of exposure to light emitted from light-emitting points P of adjacent two light-emitting point blocks $BL_{n\_i}$, $BL_{n\_i+1}$ both of which are located within the same quantization unit stripe and there may be pairs of points of exposure to light emitted from light-emitting points P of adjacent two light-emitting point blocks $BL_{n\_i}$, $BL_{n\_i+1}$ of which one is located within a quantization unit stripe and the other is located within another quantization unit stripe adjacent thereto. Therefore, one of the two points of exposure to light emitted from light-emitting points P located within the same quantization unit stripe is shifted by one unit so that an appropriate adjustment is made to the amount of shift in position of each light-emitting point P.

In this way, the gap between adjacent points of exposure to light emitted from the light-emitting point P of which the amount of shift in position is adjusted accordingly can be rendered relatively not conspicuous.

In the process of the inter-chip adjustment operation for the nth LED array chip $CH_n$, first, $B_{n\_i,i+1}=|C_{n\_i}-C_{n\_i+1}|$, and $\Delta E_{n\_i,i+1}=|A_{n\_i}-A_{n\_i+1}|\times D$ are calculated for all the light-emitting point blocks $BL_{n\_i}$ (i=1, 2, . . . , 8) in the target LED array chip $CH_n$ (S71).

Then, the process focuses attention on the leftmost (1st) light-emitting point block $BL_{n\_1}$ on (i.e., at one end of) the nth LED array chip $CH_n$, and the light-emitting point block $BL_{n\_2}$ located inwardly of (at the right end of) and adjacent to the leftmost light-emitting point block $BL_{n\_1}$, and the amount of shift (gap) $|\Delta E_{n\_1,2}-B_{n\_1,2}|$ between two points of exposure to light emitted from arbitrarily selected two light-emitting points P belonging to the light-emitting point blocks $BL_{n\_1}$, $BL_{n\_2}$, respectively, is calculated, to make a determination as to whether or not the calculated amount of shift is smaller than the quantization unit D as shown in the formula (2) (i.e., i=1 set as an initial value in step S73 is applied to the following formula (3) in step S74):

$$|\Delta E_{n\_1,2}-B_{n\_1,2}|<D \quad (2)$$

$$|\Delta E_{n\_i,i+1}-B_{n\_i,i+1}|<D \quad (3)$$

Preferably, in step S74, the amount of shift calculated between two points of exposure may be the point of exposure to light emitted from the rightmost (innermost) light-emitting point P3 of the light-emitting point block $BL_{n\_1}$ and the point of exposure emitted from the leftmost light-emitting point P4 (at the one end) of the light-emitting point block $BL_{n\_2}$ (see FIG. 13B).

If the formula (2) is satisfied (i.e., the formula (3), where i=1, is satisfied; Yes in step S74), then it is assumed that the target LED array chip $CH_n$ has necessitated no adjustment to its amount of shift in view of the difference from the shift of amount of the position of the point of exposure to light emitted from the light-emitting point on the LED array chip located leftward of and adjacent to the LED array chip $CH_n$, or the gap or difference between the amounts of shift in position of the points of exposure to light emitted from the light-emitting points in the light-emitting point block $BL_{n\_1}$ and in the light-emitting point block $BL_{n\_2}$ is considered to be insignificant and negligible, and thus the process skips the intra-chip adjustment of step S75 and goes to step S78.

If the formula (2) is not satisfied (i.e., the formula (3), where i=1, is not satisfied; No in step S74), then it is assumed that the difference between the amounts of shift in position of the points of exposure to light emitted from the light-emitting points in the leftmost light-emitting point block $BL_{n\_1}$ and in the light-emitting point block $BL_{n\_2}$ located at the right end of and adjacent to the light-emitting point block $BL_{n\_1}$ is so great as to necessitate some adjustment. Therefore, the amount of correction $A_{n\_i+1}$ for the second (ith where i=i+1) light-emitting point block $BL_{n\_2}$ is adjusted by adding or subtracting one to or from the amount of correction $A_{n\_i+1}$ so that the formula (3) is satisfied (S75). For example, when the gap in position between the points of exposure to light emitted from the light-emitting point P3 and the light emitting point P4 is too great as shown in FIG. 13B, the position of the point of exposure to light emitted from the light-emitting points of the light-emitting point block $BL_{n\_2}$ is shifted upward by one unit, so that the relative positions of the points of exposure are adjusted as shown in FIG. 13C.

Thereafter, i is incremented by one (S76), and a determination is made as to whether or not i is greater than an upper limit (7 in this embodiment) (S77). If i is not greater than the upper limit (No in step S77), then the steps S74-S76 are repeated until the condition of step S74 is satisfied, and if the condition of step S74 is satisfied, then the process goes to step S78. If it is determined in step S77 that the operation of step S76 has made i greater than the upper limit (Yes in step S77), then the process goes to step S78 because all the light-emitting point blocks $BL_{n\_1}$, $BL_{n\_2}$, . . . , $BL_{n\_8}$ within the target LED array chip $CH_n$ have been checked for possible adjustment.

In step S78, a determination is made as to whether or not all the LED array chips $CH_n$ have been checked for possible intra-chip adjustment. If it is determined in step S78 that not every LED array chip $CH_n$ has been checked for the intra-chip adjustment (No in step S78), then the process goes back to step S71 from which the intra-chip adjustment operation is performed repeatedly until it is determined in step S78 that the operation has been done for every LED array chip $CH_n$. If it is determined in step S78 that the operation has been done for every LED array chip $CH_n$ (Yes in step S78), then the process for the intra-chip adjustment operation is brought to an end.

As described above, in the color printer 1 according to the present embodiment, a determination is made as to whether or not a gap in position in the sub scanning direction between two points of exposure to light emitted from light-emitting points located at abutting ends of adjacent LED array chips is greater than the half of the quantization unit D, and if it is determined that the gap is greater than D/2, then the amounts of correction A are adjusted so that the gap becomes not greater than D/2 (inter-chip adjustment). As a result, a gap in position in the sub scanning direction between points of exposure to light emitted from light-emitting points located at abutting ends of adjacent LED array chips, which is considered to be particularly conspicuous, can be made smaller, so that unevenness in the resulting image can be suppressed and the image quality can be improved.

Although the inter-chip adjustment would result in increase in gap between points of exposure to light emitted from light-emitting points within one LED array chip $CH_n$, an inter-chip adjustment which locates a pair of adjacent light-emitting point block having a relatively small gap in position between points of exposure to light emitted therefrom to add or subtract one to or from the amount of correction A of one of the adjacent light-emitting point block found to have the relatively small gap can make such a gap in position in the sub scanning direction between the adjacent points of exposure inconspicuous so that the image quality can be improved.

Although one illustrative embodiment has been described above, the present invention is not limited to this specific embodiment, and various modifications or changes may be made practicably to the illustrated embodiment. For example, the specific process of the intra-chip adjustment is not limited to the method illustrated in the flowchart of FIG. 9; alternatively, a process as illustrated in the flowchart of FIG. 14 may be applicable.

As shown in FIG. 14, after step S71 performed for the target nth LED chip $CH_n$, the process focuses attention on the leftmost (1st) light-emitting point block $BL_{n\_1}$ on (i.e., at one end of) the LED array chip $CH_n$ and the light-emitting point $BL_{n\_2}$ located inwardly of (at the right side of) and adjacent to the leftmost light-emitting point block $BL_{n\_1}$ and the amount of shift (gap) $\Delta E_{n\_1,2} - B_{n\_1,2}|$ between two points of exposure to light emitted from arbitrarily selected two light-emitting points P belonging to the light-emitting point blocks $BL_{n\_1}$, $BL_{n\_2}$, respectively, is calculated, to make a determination as to whether or not the calculated amount of shift is smaller than the quantization unit D (S72) as shown in the formula (2):

$$|\Delta E_{n\_1,2} - B_{n\_1,2}| < D \quad (2)$$

Preferably, in step S72, the amount of shift calculated between two points of exposure may be the point of exposure to light emitted from the rightmost (innermost) light-emitting point P3 of the light-emitting point block $BL_{n\_1}$ and the point of exposure emitted from the leftmost light-emitting point P4 (at the one end) of the light-emitting point block $BL_{n\_2}$ (see FIG. 13B).

If the formula (2) is satisfied (Yes in step S72), then it is assumed that the target LED array chip $CH_n$ has necessitated no adjustment to its amount of shift in view of the difference from the shift of amount of the position of the point of exposure to light emitted from the light-emitting point on the LED array chip $CH_{n-1}$ located leftward of and adjacent to the LED array chip $CH_n$, or the gap or difference between the amounts of shift in position of the points of exposure to light emitted from the light-emitting points in the light-emitting point block $BL_{n\_1}$ and in the light-emitting point block $BL_{n\_2}$ is considered to be insignificant and negligible, and thus the process skips subsequent steps of the intra-chip adjustment of the target LED array chip $CH_n$ and goes to step S78.

If the formula (2) is not satisfied (No in step S72), then it is assumed that the difference between the amounts of shift in position of the points of exposure to light emitted from the light-emitting points in the leftmost light-emitting point block $BL_{n\_1}$ and in the light-emitting point block $BL_{n\_2}$ located at the right end of and adjacent to the light-emitting point block $BL_{n\_1}$ is so great as to necessitate some adjustment. Therefore, any light-emitting point block $BL_{n\_j}$ for which the amount of correction $A_{n\_j}$ may be adjusted by adding or subtracting one to or from the amount of correction $A_{n\_j}$ is found out. To this end, first, i=2 is set in step S173, and then a determination is made in step S74 as to whether or not the following formula (3) is satisfied:

$$|\Delta E_{n\_j,i+1} - B_{n\_i,i+1}| < D \quad (3)$$

If the formula (3) is satisfied (Yes in step S74), then adjustment is made to the amount of correction $A_{n\_j}$ so that the difference between the amounts of shift in position of the points of exposure to light from the light-emitting points in this light-emitting block $BL_{n\_i}$ and in the light-emitting block $BL_{n\_i-1}$ located leftwardly adjacent to the light-emitting block $BL_{n\_i}$. To be more specific, the amount of correction $A_{n\_j}$ for the ith light-emitting point block $BL_{n\_j}$ is adjusted by adding or subtracting one to or from the amount of correction $A_{n\_j}$ so that the formula (4) is satisfied (S175), and the process goes to step S78:

$$|\Delta E_{n\_1,2} - B_{n\_1,2}| < D \quad (4)$$

$$|\Delta E_{n\_j,i-1} - B_{n\_i-1,i}| < D \quad (4)$$

For example, when the gap in position between the points of exposure to light emitted from the light-emitting point P5 and the light emitting point P6 is small enough as shown in FIG. 13B, the position of the point of exposure to light emitted from the light-emitting points of the light-emitting point block $BL_{n\_2}$ is shifted upward by one unit, so that the relative positions of the points of exposure are adjusted as shown in FIG. 13C.

If the formula (3) is not satisfied (No in step S74), then i is incremented by one (S76), and a determination is made as to whether or not i is greater than an upper limit (7 in this embodiment) (S77). If i is not greater than the upper limit (No in step S77), then the steps S74-S76 are repeated until the condition of step S74 is satisfied, and if the condition of step S74 is satisfied, then the process goes to step S175 for adjustment. If it is determined in step S77 that the operation of step S76 has made i greater than the upper limit (Yes in step S77), then the process goes to step S78 because all the light-emitting point blocks $BL_{n\_1}$, $BL_{n\_2}$, ..., $BL_{n\_8}$ within the target LED array chip $CH_n$ have been checked for possible adjustment.

In step S78, a determination is made as to whether or not all the LED array chips $CH_n$ have been checked for possible intra-chip adjustment. If it is determined in step S78 that not every LED array chip $CH_n$ has been checked for the intra-chip adjustment (No in step S78), then the process goes back to step S71 from which the intra-chip adjustment operation is performed repeatedly until it is determined in step S78 that the operation has been done for every LED array chip $CH_n$. If it is determined in step S78 that the operation has been done for every LED array chip $CH_n$ (Yes in step S78), then the process for the intra-chip adjustment operation is brought to an end.

The present embodiment may be modified where appropriate as will be described below.

In the above-described embodiment, the plurality of light-emitting points within each light-emitting chip are grouped into a plurality of light-emitting point blocks of contiguously arranged light-emitting points, and the amount of correction A is determined to have a single value for each light-emitting point block, but it is to be understood that the amount of correction may be determined for each light-emitting point.

The memory (storage device) for storing the amounts of correction A and the amounts of shift CX, CY, C may be provided in any part of the image forming apparatus, and storage devices for storing these amounts may be distributed among several locations.

In the above-described embodiment, the quantization unit D is adopted as the threshold value F used to determine whether or not the amount of shift is too great in the intra-chip adjustment operation (step S74 in FIG. 9). This threshold value F is not limited to this quantization unit D, but any value may be used as a threshold for use in determination of step S74.

In the above-described embodiment, the amount of shift CY is measured and determined each time when the cover 2 is closed, but the measurement of the amount of shift CY may be performed each time when printing operation is started. Alternatively, as long as the LED unit 40 is not fixed to the cover 2 or other movable member but fixed to a stationary member such that once assembly and setup of the image forming apparatus is finished, the stationary member is not moved in any way, the measurement of the amount of shift CY may be omitted, and the amount of shift C may be determined based on the reference line which is determined with reference to the LED unit 40.

In the above-described embodiment, the reference line L1 of the LED unit 40 is determined to be a straight line connecting the leftmost light-emitting point P of the LED array chip $CH_1$ and the rightmost light-emitting point P of the LED array chip $CH_{19}$, but the method of determination of the reference line of the LED unit 40 is not limited to this embodiment.

In the above-described embodiment, a plurality of LED elements are used to realize a plurality of light-emitting points arranged on a light-emitting chip, but any light-emitting elements other than LEDs may be used, instead.

In the above-described embodiment, a photoconductor drum 53 is illustrated as an example of a photoconductor, but the photoconductor may be in the form of a belt.

In the above-described embodiment, the laser printer 1 is shown as one example of an image forming apparatus, but the image forming apparatus to which the present invention is applicable is not limited thereto. For example, the image forming apparatus consistent with the present invention may include a monochrome printer, a photocopier and a multi-function peripheral.

What is claimed is:

1. An image forming apparatus comprising:
    an exposure device including an exposure head having a plurality of light-emitting points arranged in a main scanning direction;
    a photoconductor configured to be exposed to light emitted from the exposure device whereby an electrostatic latent image is formed thereon;
    a controller configured to control emission of the exposure device; and
    a memory configured to store an amount of shift C in a sub scanning direction of a position of each light-emitting point of the exposure head from a reference line extending in the main scanning direction,
    wherein the exposure head of the exposure device includes a plurality of light-emitting chips on which the plurality of light-emitting points are arranged in the main scanning direction, the plurality of light-emitting chips being arranged in positions such that adjacent light-emitting chips arranged in the main scanning direction are shifted from each other in position in a sub scanning direction that is a direction perpendicular to the main scanning direction, and
    wherein the controller includes:
        an emission timing determination unit configured to determine a quantized amount of correction A to be applied to emission timing with which each light-emitting point is to be caused to give off light emission; and
        an exposure head driver unit configured to cause each light-emitting point to give off light emission at a time shifted from a reference time by an amount of time corresponding to the amount of correction A determined by the emission timing determination unit,
    whereby points of exposure to light emitted from the light-emitting points are aligned substantially with a straight line extending in the main scanning direction on the photoconductor, and
    wherein the emission timing determination unit includes a tentative correction amount determination operation module configured to tentatively determine an amount of correction A for each light-emitting point based on a quotient obtained by dividing the amount of shift C stored in the memory by a quantization unit D, an inter-chip adjustment operation module configured to perform, if the following formula (1) is not satisfied for each pair of tentatively determined amounts of correction A1, A2, an inter-chip adjustment operation of adding or subtracting one to or from one of the amounts of correction A1, A2, the amount of correction A1 being an amount determined by the tentative correction amount determination operation module for a light-emitting point (P1) at one end of a first light-emitting chip, the amount of correction A2 being an amount determined by the tentative correction amount determination operation module for a light-emitting point (P2) at an opposite end of a second light-emitting chip adjacent to the first light-emitting chip, the opposite end of the second light-emitting chip being one of two ends closer to the first light-emitting chip, to thereby determine the amount of correction A which satisfies the following formula (1):

$$|\Delta E - B| < \frac{D}{2} \quad (1)$$

where B is a difference $|C1-C2|$ that is a difference between an amount of shift C1 of a position of the light-emitting point (P1) and an amount of shift C2 of a position of the light-emitting point (P2), $\Delta E$ is a value derived from $|A1-A2|$ multiplied by the quantization unit D, in which $|A1-A2|$ is the difference between the amount of correction A1 for the light-emitting point (P1) of the first light-emitting chip and the amount of correction A2 for the light-emitting point (P2) of the second light-emitting chip.

2. The image forming apparatus according to claim 1, wherein the emission timing determination unit further includes an intra-chip adjustment operation module configured to perform, if the following formula (2) is not satisfied after the operation of the inter-chip adjustment operation, an intra-chip adjustment operation of adding or subtracting one to or from an amount of correction for at least one light-emitting point other than the light-emitting points at both ends of each light-emitting chip so that the following formula (3) is satisfied:

$$|\Delta E_{n\_1,2} - B_{n\_1,2}| < F \quad (2)$$

$$|\Delta E_{n\_i,i+1} - B_{n\_i,i+1}| < F \quad (3)$$

where $|\Delta E_{n\_1,2} - B_{n\_1,2}|$ is an amount of shift in the sub scanning direction of a position between a point of exposure to light to be emitted from a light-emitting point at one end of an nth light-emitting chip and an amount of shift in the sub scanning direction of a position of a point of exposure to light to be emitted from a light-emitting point adjacent inwardly to the light-emitting point at the one end of the nth light-emitting chip, and F is a predetermined threshold value, wherein $\Delta E_{n\_i,i+1} = |A_{n\_i} - A_{n\_i+1}| \times D$ where $A_{n\_i}$ is an amount of correction of the position of an ith light-emitting point on the nth light-emitting chip, and $B_{n\_i,i+1} = |C_{n\_i} - C_{n\_i+1}|$ where $C_{n\_i}$ is an amount of shift of a position of the ith light emitting point on the nth light-emitting chip.

3. The image forming apparatus according to claim 2, wherein the plurality of light-emitting points within each light-emitting chip are grouped into a plurality of light-emitting point blocks of contiguously arranged light-emitting points, the amount of shift C stored in the memory is determined to have a single value for each light-emitting point block, and the amount of correction A is determined in the emission timing determination unit to have a single value for each light-emitting point block.

4. The image forming apparatus according to claim 1, wherein the plurality of light-emitting points within each light-emitting chip are grouped into a plurality of light-emitting point blocks of contiguously arranged light-emitting points, the amount of shift C stored in the memory is determined to have a single value for each light-emitting point block, and the amount of correction A is determined in the emission timing determination unit to have a single value for each light-emitting point block.

5. The image forming apparatus according to claim 1, wherein the reference line is defined with reference to a position fixed in a body of the image forming apparatus, and the amount of shift C stored in the memory has a value determined on or after installation of the exposure device.

6. The image forming apparatus according to claim 1, wherein the plurality of light-emitting chips are in a staggered arrangement.

* * * * *